United States Patent
St. John-Larkin

(10) Patent No.: US 8,750,688 B2
(45) Date of Patent: Jun. 10, 2014

(54) SYSTEMS AND METHODS FOR SELECTIVELY RECORDING AT LEAST PART OF A PROGRAM BASED ON AN OCCURRENCE OF A VIDEO OR AUDIO CHARACTERISTIC IN THE PROGRAM

(75) Inventor: David Christopher St. John-Larkin, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1742 days.

(21) Appl. No.: 11/859,622

(22) Filed: Sep. 21, 2007

(65) Prior Publication Data

US 2009/0080857 A1 Mar. 26, 2009

(51) Int. Cl.
*H04N 5/92* (2006.01)
*H04N 21/439* (2011.01)

(52) U.S. Cl.
CPC .................................. *H04N 21/4392* (2013.01)
USPC ........................................... 386/326; 386/239

(58) Field of Classification Search
CPC ..................... H04N 21/4335; H04N 21/44004; H04N 21/23406; H04N 21/2401; H04N 21/4392
See application file for complete search history.

(56) References Cited

U.S. PATENT DOCUMENTS

| | | | |
|---|---|---|---|
| 2004/0059570 A1* | 3/2004 | Mochinaga et al. | 704/205 |
| 2004/0170392 A1* | 9/2004 | Lu et al. | 386/96 |
| 2005/0063418 A1* | 3/2005 | Case | 370/466 |
| 2005/0152686 A1* | 7/2005 | Takashimizu et al. | 386/111 |

\* cited by examiner

*Primary Examiner* — William C Vaughn, Jr.
*Assistant Examiner* — Asher Khan
(74) *Attorney, Agent, or Firm* — Seed IP Law Group PLLC

(57) ABSTRACT

Systems and methods may provide for selectively recording of at least part of a program based on an occurrence of at least one video or audio characteristic in the program. The systems and methods may involve receiving or transmitting a program including a video stream and an audio stream, and monitoring at least one of the video stream and the audio stream for at least one video or audio characteristic. Based on the occurrence of the video or audio characteristic, at least part of the program may be recorded or instructions for recording at least part of the program may be transmitted. In some embodiments, only a segment of the program may be recorded or instructed to be recorded. In some embodiments, segments from a plurality of programs may be recorded and associated together. In such embodiments, the segments may be presented as a single recording.

25 Claims, 3 Drawing Sheets

SYSTEMS AND METHODS FOR SELECTIVELY RECORDING AT LEAST PART OF A PROGRAM BASED ON AN OCCURRENCE OF A VIDEO OR AUDIO CHARACTERISTIC IN THE PROGRAM

TECHNICAL FIELD

The inventive field relates generally to presenting multiple video feeds as a single channel via a client device, such as a set top box (STB), satellite receiver, digital video recorder (DVR) or similar device, and also to selectively recording a program or part of a program based on an occurrence of a video or audio characteristic in the program.

BACKGROUND DISCUSSION

The proliferation of subscription television programming, the increasing number of available channels, and the corresponding increase in television programming have led to continued development of various features and capabilities of client devices and broadcast services. For example, the interactivity of onscreen program directories and guides has been significantly increased over the years. Further, other user interactive features, such as the ability to set timers to record programs, the ability to set user preferences, for example, for how information is displayed, and the ability to lock or otherwise control access to channels has been developed.

Recent developments include the expansion of such features to include remote task scheduling via the Internet. Such approaches typically allow a subscriber of television services to interact with their client device remotely via a website that provides various functions to permit the subscriber to instruct their client device to perform certain activities, such as setting a timer to record a program or initiating recording based on an instruction scheduled through the website. In general, such approaches aim to allow the subscriber to perform various functions remotely that are conventionally performed by the subscriber directly using the client device.

Many conventional client devices are configured to receive programs and program information from one or more sources, generally referred to as the service provider or broadcast service. The programs and the program information may be provided to the client device via one or more communication channels. For example, in a cable broadcast system, the programs and the program information may be provided to the client device via a coaxial cable connected to an input of the client device. In a satellite broadcast system, the programs and the program information may be provided to the client device via a satellite dish that is connected to an input of the client device via a coaxial cable.

In general, client devices may buffer the data received from the service provider or broadcast service. This allows the client device to time shift a program being displayed, for example, to pause, rewind, etc. This buffering may also facilitate recording of a program, by allowing a user to record a program that has already been partially displayed prior to the decision to record.

SUMMARY

Many conventional client devices are not configured to selectively record segments of programs or to selectively record programs based on content of the programs, such as audio and/or video events that occur in the programs.

Systems and methods for selectively recording a program or a part of a program based on audio and/or video characteristics of the program may be an advantageous approach. Various embodiments described herein relate to systems and methods that provide such a capability.

Some embodiments may provide a method for selectively recording at least part of a program. The method may comprise: receiving or transmitting a program including a video stream and an audio stream; monitoring at least one of the video stream and the audio stream for at least one video or audio characteristic; and recording or transmitting instructions for recording at least part of the program based on an occurrence of the at least one video or audio characteristic.

In some embodiments, the recording or transmitting instructions for recording at least part of the program may comprise recording or transmitting instructions for recording a segment of the program. The method may further comprise setting at least one of an end and a start of the segment to be recorded based on the occurrence of the at least one video or audio characteristic. In such embodiments, a length of the segment may be predefined, or may be determined based on the at least one video or audio characteristic.

In some embodiments, audio heuristics data of the program may be monitored. In other embodiments, video heuristics data of the program may be monitored. In still other embodiments, both audio and video heuristics data of the program may be monitored.

In some embodiments, a latent tuner of a client device may be used for monitoring the video stream and/or the audio stream.

In some embodiments, segments from a plurality of programs may be recorded and associated together. In such embodiments, the associated segments may be presented as a single recoding.

Some embodiments may provide a system for selectively recording at least part of a program. The system may comprise: a broadcast device configured to transmit a program including a video stream and an audio stream or a client device configured to receive a program including a video stream and an audio stream; and a processor configured to monitor at least one of the video stream and the audio stream for at least one video or audio characteristic and to record or transmit instructions for recording at least part of the program based on an occurrence of the at least one video or audio characteristic.

Some embodiments may provide a computer-readable storage medium including instructions for carrying out the various methods.

By using various embodiments, selective recording of programs or parts of programs may be performed automatically based on audio and/or video events that occur in the programs. For example, a "highlights reel" recording may be obtained by using various embodiments.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

Figure 1:
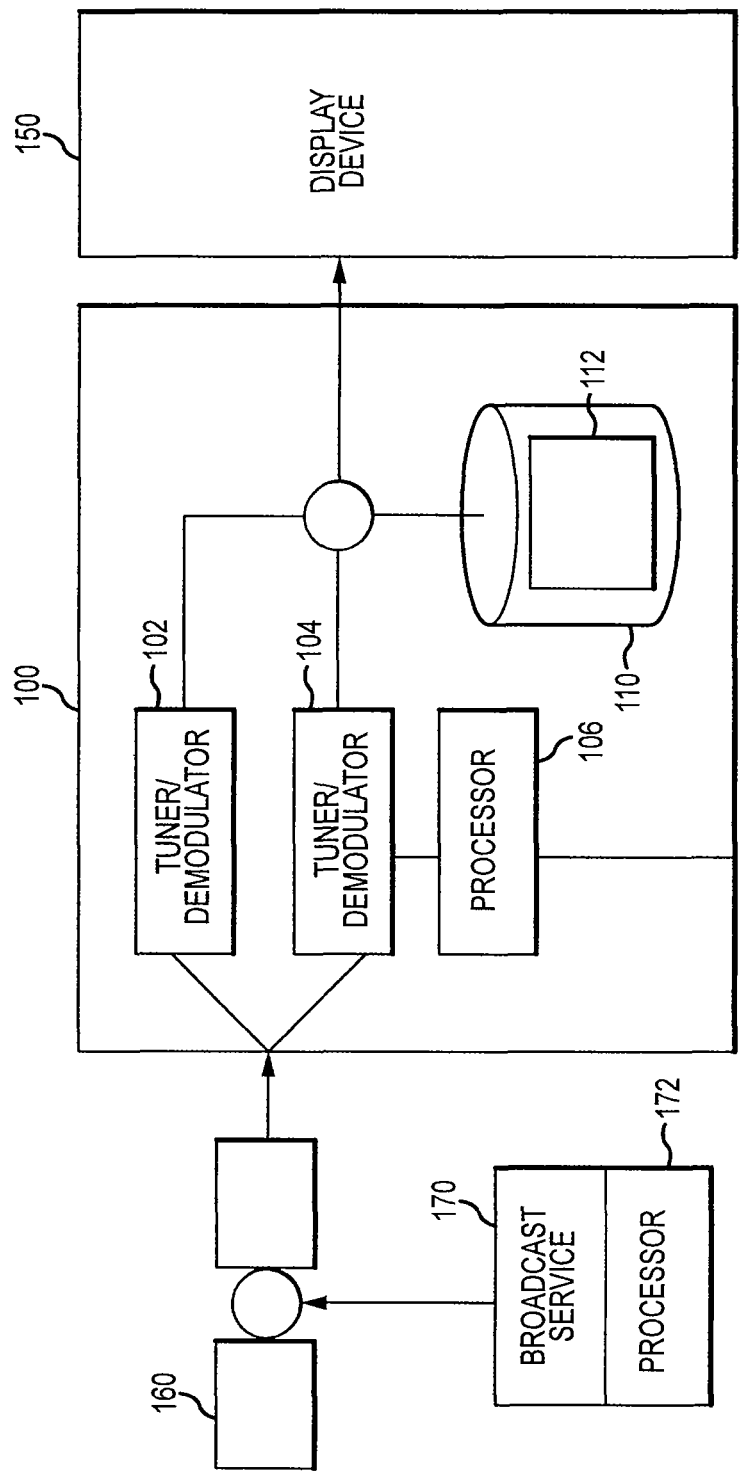
FIG. 1 is an exemplary block diagram illustrating components of an example of a broadcast satellite television system.

As used herein, the term "client device" is intended to encompass a device that is configured to receive programs and/or program information from a broadcast source (e.g., satellite, cable, Internet, etc.) and to facilitate display the programs and/or the program information on a display device, such as a television or a monitor. Although not restricted to a particular implementation, the term "client device" is intended to encompass set top boxes, satellite receivers, digital video recorders, and the like. The client devices described herein may be embodied in software and/or hardware that facilitate the reception and display of programs and/or program information from a broadcast source of any suitable type (e.g., satellite, Internet protocol, wireless, etc.).

The embodiments shown in the Figures illustrate systems and methods that may allow programs and/or parts of programs to be selectively recorded based on audio and/or video events that occur in the programs. The illustrated systems and methods provide examples of how such selective recording may be implemented. However, it should be understood that other implementations are possible and contemplated.

Selective recording of programs or parts of programs may be desirable for many reasons. For example, an entire program or a particular segments of a program may be recorded that may be of interest to a user of a client device based on a particular event that occurs in the program. Such events may be defined by heuristics data of the program. For example, the user may be only interested in soccer games in which goals are scored or in movies that include a car chase or racing. Programs may be monitored for such occurrences and recorded based on such occurrences. In particular, segment(s) of the program(s), such as an amount of time before and/or after the occurrence(s) may be recorded, for example, to provide a recording of "highlights" from the program(s).

Client devices are known to include multiple tuners. In some embodiments as described herein, such multiple tuners may facilitate monitoring of programs for selective recording. For example, a latent tuner, i.e., a tuner receiving a channel of programming that is not currently being displayed, may be used. A processor, either on the client-side or the provider-side as described herein, may monitor programs received by the latent tuner. The programs may be monitored for audio and/or video events that are expected to occur in the programs. In particular, the programs may be monitored for audio and/or video characteristics, which may be associated with or otherwise define particular audio and/or video events in programs. For example, a "two-minute warning" in a program of a football game may be identified by audio and/or video characteristics, such as images of "2:00" or less on a clock and "$4^{th}$ qtr." and/or a whistle and announcement by a referee or announcer. Audio characteristics may include particular sounds such as, for example, crowd noise level at sporting events, the crack of a bat in baseball, the goal horn in hockey, a car crash, a revving engine, squealing tires, gunshots, etc., that are associated with particular events. Similarly, video characteristics may include particular images or series of images such as, for example, a finish line, a goal net or line, a fast moving car, etc., that are associated with particular events.

When the processor detects an occurrence of the audio and/or video characteristic in a program, the processor may provide instructions to the client device to record the entire program or a segment of the program that includes the audio and/or video characteristic. The segment to be recorded may be of a predetermined length, for example, recording a set amount of time before and/or after the occurrence. Alternatively, the length of the segment to be recorded may be determined based on the particular audio and/or video characteristic. For example, a longer segment my be desired to record a car chase than may be desired to record a goal in hockey.

In some embodiments, both audio and video characteristics may be monitored, for example, to monitor for multiple types of events that may not have a suitable audio characteristic or a suitable video characteristic associated therewith. In other words, some events may be more efficiently monitored for by an audio characteristic than a video characteristic, and vice versa. Also, both audio and video characteristics may be monitored to enhance the ability of event identification. For example, a video characteristic, such as a finish line or a goal line, may be used in combination with an audio characteristic, such as crowd noise level, to monitor for the event of the line being crossed, rather than just being shown.

In some embodiments, the selective recording of a program may include not recording a particular event. As such, a program may be recorded with one or more segments omitted. In other words, an audio characteristic and/or a video characteristic may trigger a segment of the program including the particular characteristic(s) to not be recorded whereas the remainder of the program is recorded. For example, a movie may be recorded in such a manner to exclude recording of the credits to free space for other recordings. Also, particular scenes may be omitted from the recording of the movie, such as graphic sex or violence scenes, for example, to render the movie suitable to a particular audience.

As such, it is envisioned that an entire program may not be recorded based on the occurrence of particular audio and/or video characteristic(s) associated with a particular event. For example, a client device may be programmed or otherwise configured to record all programs of a particular channel, such as a family movie channel, but may be set to not record any programs including a particular event, such as sex or violence, of that channel based on the occurrence of the particular characteristic(s).

In some embodiments, multiple recordings of segments of one or more programs may be associated together. The associated recorded segments may then be presented as a single recording, for example, to be played back as a "highlights reel" of the program or programs. For example, segments of a program, such as a movie or a sporting event, may be selectively recorded based on the occurrences of specified audio and/or video characteristics (e.g., particular events in the program). Once the recorded segments are associated together, the segments may be played back or stored as a single recording. Thus, a user may not need to watch or record an entire program to view details of particular interest regarding the program.

Similarly, segments of a plurality of related programs, such as professional sports, may be selectively recorded and associated to provide a "highlights reel" of a particular day or week, for example, of games in one sport, specified sports, or all sports as desired. Thus, a user may not need to watch or record a general news or sports news program to be updated with details of particular interest regarding sporting events of interest for a given day, week, etc.

It should be understood that the following embodiments illustrate various details in a simplified manner and do not include all variants, extensions or modifications that are contemplated. As such, any suitable or desired criteria for controlling recording of programs or parts of programs, whether automatic or requiring user interaction, may be implemented with such approaches that selectively record at least part of a program based on the occurrence of a particular event. For example, user preferences and/or historical data of the user/client device may provide additional criteria for recording.

Such criteria may establish channels, types of programs, and/or types of program content to be automatically recorded, with the selectivity based on the occurrence of audio and/or video characteristics determining programs defined by such criteria and/or parts of such programs to be recorded or not recorded. Alternatively or additionally, a user may provide an instruction to record a program, a series of programs, a particular channel, etc., for a fixed time period, periodically or indefinitely, with the selectivity based on the occurrence of audio and/or video characteristics determining programs defined by such criteria and/or parts of such programs to be recorded or not recorded.

It should be understood that various implementations are possible. For example, satellite, cable, internet or other broadcasting technologies may be suitable. Thus, while the following description provides an example in the context of a satellite broadcast system, it should be understood that such description is not limiting.

Figure 2:
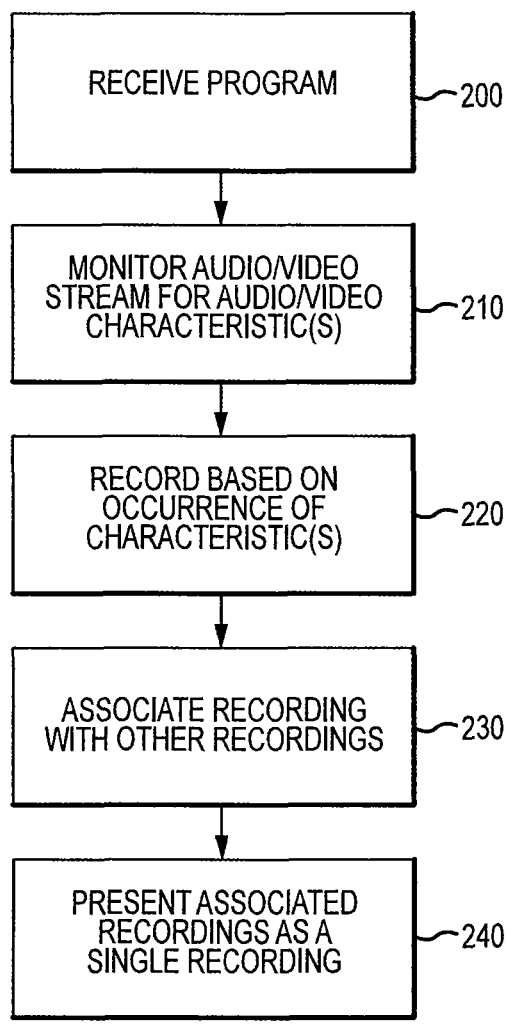
FIG. 2 is an exemplary block diagram illustrating an example of client-side operations for selectively recording at least part of a program.
Figure 3:
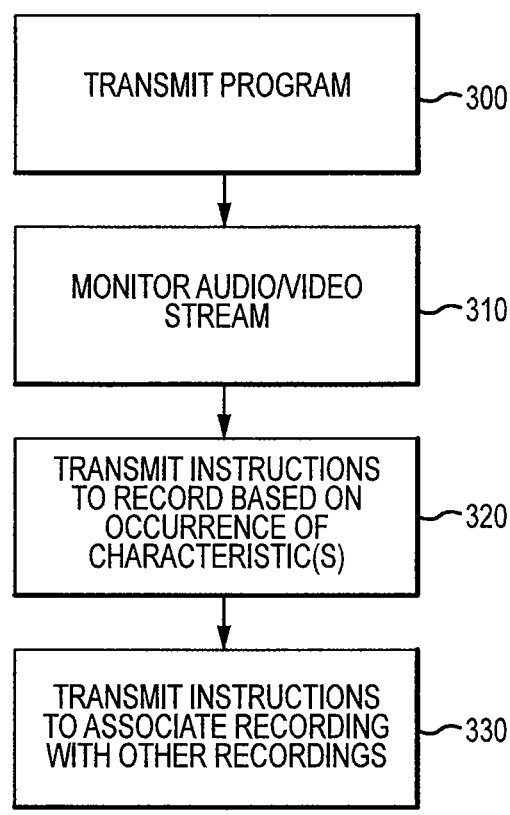
FIG. 3 is an exemplary block diagram illustrating an example of provider-side operations for selectively recording at least part of a program.

The block diagram shown in FIG. 1 and the flowcharts shown in FIGS. 2 and 3 are for illustration only and are not intended to represent the only possible process flows and system configurations. In particular, it should be understood that operations may be added, omitted and recorded as may be suitable to a particular application. Also, individual components may be added, omitted, replaced and interrelated as may be suitable to a particular application. All details appurtenant to implementing the exemplary systems and methods that are well understood in the art are omitted for simplicity and clarity.

FIG. 1 is a simplified block diagram illustrating components of an example of a broadcast satellite television system that may be used to implement various features described herein. In particular, FIG. 1 generally illustrates a client device 100 as part of a satellite broadcast system. In this example, a broadcast service 170 provides programs and program information, via one or more satellites 160, to the client device 100. The broadcast service 170 may include a processor 172, which is discussed further below. The client device 100 may include suitable circuitry, other hardware and/or software to receive a signal(s) from the satellite(s) 160, such as a satellite dish or antenna (not shown).

The signal(s) from the satellite(s) 160 may carry multiple channels of programs, program information (such as electronic programming guide data), and/or other information, such as conditional access data. The signal(s) from the satellite(s) 160 received at the client device 100 may be processed such that the data and/or the channels may be viewed on a display device 150, such as a television set or monitor.

The client device 100 may include a first tuner unit 102 and a second tuner unit 104, each of which may comprise a tuner, a demodulator, and any other device or circuitry for selecting channels and modifying the data format for processing and/or displaying on the display device 150. While one of the first and second tuner units 102, 104 is selected for displaying programs and/or program information on the display device 150, the other of the first and second tuner units 102, 104 may be considered to be latent (with respect to displaying data). It should be understood that any number of tuner units may be employed, with such units not currently being used for displaying being considered latent.

The client device 100 may also include a processor 106 for controlling various operations of the client device 100 and/or the other components thereof. The client device 100 may also include a storage device 110, which may have a program and/or associated data stored thereon, in addition or alternatively to such program and/or data rendered on the display device 150. The storage device 110 may also be used to store user preferences, set-up information and/or other criteria 112, as discussed further below, usually specific to the client device 100.

Regardless of the particular implementation of the client device 100 and/or the broadcasts system in general, a system for selectively recording at least part of a program based on events that occur in the program is contemplated. In operation, as discussed above, one of the first and second tuner units 102, 104 may be currently presenting a program for display and the other may be considered to be latent. The latent tuner unit may be used to monitor either an audio stream or a video stream, or both, of a program that is being transmitted on a channel to which the latent tuner unit is set.

It should be understood that the non-latent tuner unit may also be used to monitor the audio stream and/or video stream of the program being received thereby, but such is not described for the sake of simplicity and brevity. Such an approach may allow a user to view a program and to selectively record the program or part of the program as described herein with respect to the latent tuner unit.

Using a latent tuner unit for monitoring and selectively recording may provide greater flexibility, for example, by not restricting the programs to channels currently being displayed or viewed. Using a latent tuner unit may also allow the channel to be monitored to be set automatically and/or changed automatically. For example, assuming sufficient latent tuners are present for simultaneous monitoring, an entire Sunday's worth of football games may be monitored for selective recording of each game. The processor 106 of the client device 100 and/or the processor 172 of the broadcast service 170 may be configured to manage the latent tuners to set the latent tuner units to different channels to monitor the various games. This may take into account any game(s) that the non-latent tuner receives. Thus, a user may be able to watch, for example, an early game, a late game and/or a night game while the games not watched are selectively recorded, for example, to generate one or more recordings of highlights of the games not watched. If desired, the games watched may also be selectively recorded.

As a general, simplified example, a program received by the first tuner unit 102 may be displayed and the second tuner unit 104 may be considered to be latent. The processor 106 of the client device 100 and/or the processor 172 of the broadcast service 170 may be configured to monitor programs received by the second tuner unit 104. For the sake of simplicity and brevity, operation of the processor 106 of the client device 100 is described herein. However, it should be understood that any or all client-side operations may be performed as broadcast service-side operations, as appropriate or desired.

The processor 106 may automatically set the second tuner unit 104 to receive a particular channel, for example, for a given time slot, to receive a particular program. It should be understood, however, that any suitable arrangement may be used for channel and/or program selection for the second tuner unit 104. As the second tuner unit 104 receives the audio and video streams for the program, the processor 106 may monitor the audio stream for one or more audio characteristics and/or may monitor the video stream for one or more video characteristics.

Such audio and video characteristics may be particular sounds, images, combinations of sounds, combinations of images or combinations of sounds and images that are associated with a particular type of event. The audio and/or video characteristics to be monitored may be specific to a type of program, e.g., associated with event(s) expected in the type of program. For example, particular audio and/or video characteristics may be monitored for sporting event programs to ensure that scoring events or other game impacting events are selectively recorded. Further, the particular audio and/or video characteristics to be monitored may be tailored to the type of sporting event, for example, based on the types of events that are important. Similarly, particular audio and/or video characteristics may be monitored for movies and/or for categories of movies, e.g., action, drama, comedy, etc. Thus, it should be understood that different audio and/or video characteristics may be monitored for different programs, as appropriate or desired.

When the processor 106 detects an occurrence of the audio and/or video characteristics, the processor 106 may cause the entire program to be recorded or may cause a segment of the program that includes the event associated with the audio and/or video characteristics. A length of the segment to be recorded may be preset, for example, as a certain amount of elapsed time before and/or after the occurrence of the audio and/or video characteristics. In some embodiments, the length of the segment may be defined based on the type of event, as some events make take longer to transpire. As such, the length of the segment may be defined based on the audio and/or video characteristics.

A plurality of events of interest may occur during the program, and thus a plurality of segments may be recorded for the program. Each of the recorded segments may be stored in the storage device 110. Either during storage or after monitoring is completed for the program, the recorded segments may be associated together. For example, the processor 106 may associate the recorded segments to generate a single recording for the program that includes all of the segments. Once generated, the single recording may be available to the user of the client device 100 for playback.

Although selective recording of a single program is described above, it should be understood that the foregoing may be applied to selectively recording multiple programs, as appropriate or desired. Further, it should be understood that, in embodiments in which operations are performed by the processor 172 of the broadcast service 170, recordings may be stored elsewhere, for example, to provide access to such recordings by multiple client devices.

As noted above, operations for selectively recording may be performed either on the client-side or the provider-side, or both. FIG. 2 illustrates an example of client-side operations for selectively recording at least part of a program. In such case, the program is first received by the client device in operation 200. Specifically, a video stream and an audio stream for the program is received by a tuner of the client device. As the video and audio streams are received, one or both may be monitored by the processor, or other suitable component; of the client device for one or more video and/or audio characteristics in operation 210. Based on each occurrence of the video and/or audio characteristics, the client device may be controlled to record segments of the program in operation 220. As discussed above, the entire program may also be recorded, for example, based on a single occurrence of the video and/or audio characteristics or a sufficient (e.g., threshold) number of occurrences in the program.

When segments of the program are recorded, the recorded segments may be associated together in operation 230. For example, the recorded segments may be stored as a single recording or otherwise linked so as to be presented as a single recording in operation 240. Presenting the recorded segments as a single recording may comprise playback of all recorded segments or may comprise a display of the program (e.g., by title) that allows the user to select individual segments, groups of segments or all segments for viewing.

FIG. 3 illustrates an example of provider-side operations for selectively recording at least part of a program. The program is first transmitted by the broadcast service to be received by one or more the client devices in operation 300. Specifically, a video stream and an audio stream for the program may be transmitted, for example, via satellite. As the video and audio streams are transmitted, one or both may be monitored by the processor, or other suitable component; of the broadcast service for one or more video and/or audio characteristics in operation 310. Based on each occurrence of the video and/or audio characteristics, instructions to record segments of the program may be transmitted to the client device(s) in operation 320. Alternatively, as discussed above, the entire program may also be recorded. Further, when segments of the program are recorded, instructions for associating the recorded segments together may be transmitted to the client device(s) in operation 330.

Although not illustrated, it should be understood that the instructions to record, as well as the instructions to associate, may be transmitted to a suitable device or devices, other than client devices, that are capable of recording and/or associating. As such, the recorded program or recorded segments of the program may be stored for transmission to one or more client devices. Because such an approach does not rely on the number of available tuners that a client device may include, the selective recording may be applied to any or all programs transmitted from the broadcast service.

It should also be understood that the broadcast service need not transmit a program to selectively record the program or part of the program. Rather, any suitable approach for monitoring or searching the video and/or audio stream of the program may be employed.

Further, although not shown for the sake of clarity and simplicity, it should be understood that other features described above may be incorporated in the operations illustrated in FIGS. 2 and 3. For example, operations for selectively recording segments of multiple programs may be included. Accordingly, the approaches shown in the block diagrams of FIGS. 2 and 3 should be understood as being illustrative only and not limiting.

Other implementations may be envisioned based on the foregoing disclosure. For example, alternatively or additionally to recording or providing instructions to record, a user may be notified of the occurrence of audio and/or video events that occur in a program. Such notification may prompt the user to take various actions, such as to record and/or view the particular program or segment associated with the notification. In some embodiments, the notification may be based on monitoring a program that is currently being viewed. In other embodiments, the notification may be related to other programs not currently being viewed, for example, being monitored by latent tuners of the client device and/or other devices external to the client device.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of this disclosure.

What is claimed is:

1. A method for selectively recording at least part of a program, the method comprising:

receiving a program including a video stream and an audio stream at a client device, the client device including at least a recorder;

buffering the program in a temporary storage as the program is being received;

monitoring, by a processor, at least one of the video stream and the audio stream to detect a triggering event, the triggering event being a video or audio characteristic; and upon detecting the triggering event, beginning to record, by the recorder, a program segment, the program segment including a first program segment portion-buffered in the temporary storage prior to the detecting of the triggering event and a second program segment portion after the detecting of the triggering event.

2. The method of claim 1, wherein the operation of recording the program segment is performed in response to instructions, received at the client device, for recording a segment of the program.

3. The method of claim 2, further comprising setting at least one of an end and a start of the segment to be recorded based on the occurrence of the at least one video or audio characteristic.

4. The method of claim 2, wherein a length of the segment is determined based on the at least one video or audio characteristic.

5. The method of claim 1, wherein monitoring at least one of the video stream and the audio stream for at least one video or audio characteristic comprises monitoring heuristics data of the program.

6. The method of claim 1, wherein monitoring at least one of the video stream and the audio stream for at least one video or audio characteristic comprises monitoring both audio and video heuristics data of the program.

7. The method of claim 1, wherein receiving the program is performed by a latent tuner of the client device.

8. The method of claim 1, wherein the recording of the program based on an occurrence of the at least one video or audio characteristic comprises at least one of not recording at least part of the program.

9. The method of claim 2, further comprising:
recording a plurality of segments of the program; and
associating the plurality of recorded segments together.

10. The method of claim 9, further comprising presenting the associated segments as a single recoding.

11. The method of claim 2, further comprising:
recording segments from a plurality of programs; and
associating the recorded segments together.

12. The method of claim 11, further comprising presenting the associated segments as a single recoding.

13. A system for selectively recording at least part of a program, the system comprising:
at least one of a broadcast device configured to transmit a program including a video stream and an audio stream and a client device configured to receive a program including a video stream and an audio stream;
a temporary storage configured to buffer the program as the program is being received;
a processor configured to monitor at least one of the video stream and the audio stream to detect a triggering event, the triggering event being a video or audio characteristic and, upon detection of the triggering event, configured to at least one of record and transmit instructions for recording a program segment, the program segment including a first program segment portion buffered in the temporary storage prior to the detection of the triggering event and a second program segment portion after the detection of the triggering event.

14. The system of claim 13, wherein the processor is configured to record or transmit instructions for recording the program segment.

15. The system of claim 14, wherein the processor is further configured to set at least one of an end and a start of the segment to be recorded based on the occurrence of the event.

16. The system of claim 14, wherein the processor is configured to determine a length of the segment based on the video or audio characteristic.

17. The system of claim 13, wherein the processor is configured to monitor heuristics data of the program.

18. The system of claim 13, wherein the processor is configured to monitor both audio and video heuristics data of the program.

19. The system of claim 13, wherein the client device comprises a plurality of tuners, at least one of which is a latent tuner, the processor being configured to monitor at least one of the video stream and the audio stream of the program received by the latent tuner.

20. The system of claim 13, wherein the processor is configured to at least one of not record and transmit instructions for not recording at least part of the program.

21. The system of claim 14, wherein the processor is configured to at least one of record and transmit instructions for recording a plurality of segments from the program and to associate the plurality of recorded segments together.

22. The system of claim 13, wherein the processor is further configured to present the associated segments as a single recoding.

23. The system of claim 21, wherein the processor is configured to at least one of record and transmit instructions for recording segments from a plurality of programs and to associate the recorded segments together.

24. The system of claim 23, wherein the processor is further configured to present the associated segments as a single recoding.

25. A non-transitory computer-readable storage medium including instructions for:
receiving a program including a video stream and an audio stream;
buffering the program in a temporary storage as the program is being received;
monitoring at least one of the video stream and the audio stream to detect a triggering event, the triggering event being a video or audio characteristic; and
upon detecting the triggering event, beginning to record a program segment, the program segment including a first program segment portion buffered in the temporary storage before the detecting of the triggering event and a second program segment portion after the detecting of the triggering event.

* * * * *

UNITED STATES PATENT AND TRADEMARK OFFICE
CERTIFICATE OF CORRECTION

| | | |
|---|---|---|
| PATENT NO. | : 8,750,688 B2 | Page 1 of 1 |
| APPLICATION NO. | : 11/859622 | |
| DATED | : June 10, 2014 | |
| INVENTOR(S) | : St. John-Larkin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1876 days.

Signed and Sealed this
Twenty-sixth Day of January, 2016

Michelle K. Lee
*Director of the United States Patent and Trademark Office*